United States Patent [19]

McCormick et al.

[11] E Re. 31,462

[45] Reissued Dec. 13, 1983

[54] ELECTRICAL CONNECTOR

[75] Inventors: Larry L. McCormick; Ben F. Selk, both of Los Angeles, Calif.

[73] Assignee: Automation Industries, Inc., Greenwich, Conn.

[21] Appl. No.: 253,650

[22] Filed: May 13, 1981

Related U.S. Patent Documents

Reissue of:

[64] Patent No.: 3,848,950
Issued: Nov. 19, 1974
Appl. No.: 287,184
Filed: Sep. 7, 1972

[51] Int. Cl.[3] ..... H01R 13/629

[52] U.S. Cl. ..... 339/90 R; 339/186 M

[58] Field of Search ..... 339/88 R–90 C, 339/113 R, 49 R

[56] References Cited

U.S. PATENT DOCUMENTS

| | | | |
|---|---|---|---|
| 2,739,290 | 3/1956 | Child | 339/49 R |
| 2,987,691 | 6/1961 | Ross | 339/49 R |
| 3,116,942 | 1/1964 | Morello | 339/90 R |
| 3,271,726 | 9/1966 | Pfendler | 339/49 R |
| 3,312,928 | 4/1967 | Nava et al. | 339/111 X |
| 3,322,443 | 5/1967 | Brown | 285/361 X |
| 3,605,069 | 9/1971 | Dorrell | 339/90 R |

FOREIGN PATENT DOCUMENTS

| | | |
|---|---|---|
| 449656 | 5/1913 | France . |
| 876394 | 8/1961 | United Kingdom . |
| 911138 | 11/1962 | United Kingdom . |

*Primary Examiner*—Eugene F. Desmond
*Attorney, Agent, or Firm*—Francis N. Carten

[57] ABSTRACT

An electrical connector is disclosed herein which employs a breech lock whereby the two sections of the connector may be readily mated or unmated by a simple rotation of the breech lock through a fraction of a turn. In addition, means are also provided for retracting the electrical contacts into a protected position until the two sections are fully mated.

33 Claims, 11 Drawing Figures

ELECTRICAL CONNECTOR

Matter enclosed in heavy brackets [ ] appears in the original patent but forms no part of this reissue specification; matter printed in italics indicates the additions made by reissue.

BACKGROUND

At the present time there is a large variety of different types of connectors for joining the individual wires in a first cable with the individual wires in a second cable. Most of these connectors are satisfactory for the applications they are designed for. However, many of them have limitations which reduce their usefulness and prevent or severely restrict their use on other applications.

One problem which has frequently been encountered is the mating of the two sections of the connector. The mating operation has frequently required a considerable amount of manual manipulation such as screwing the parts together. Such manual manipulation is both time consuming and difficult particularly when the connector is located in an inaccessible location which is difficult to reach. Moreover, in many of the prior connectors the force and loads on various parts of the connector have been extremely high. This has been particularly true where there is a large number of contacts which must be forced together during mating. As a result of these high loads and forces, some parts of the connector sections such as the locking mechanisms have failed prematurely.

Another problem which has frequently been encountered is maintaining the connector sections and particularly the electrical contacts therein in a fully mated condition. This is an especially common problem when the connector is used in an environment where substantial amounts of vibration, etc, are present.

SUMMARY

The present invention provides means for overcoming the foregoing difficulties. More particularly, means are provided whereby the two separate sections of the connector can be readily mated and/or unmated with a minimum amount of manual manipulation. This is accomplished in one embodiment by providing a breech lock for securing the sections together.

The lock includes an outer sleeve which can be rotated through a limited part of a turn to completely mate or completely unmate the two sections of the connector.

A high pitch thread is provided in all embodiments for completely retracting or completely extending the electrical contacts when the outer sleeve lock is rotated through a limited part of a turn. In addition, a spring is provided which cooperates with the high-pitch thread to assist in mating the various contacts and keeping them mated. The combination of the high pitch thread and the forces from the spring create a torque which maintains the connector and the contacts therein fully mated at all times.

DRAWINGS

DESCRIPTION

Figure 4:
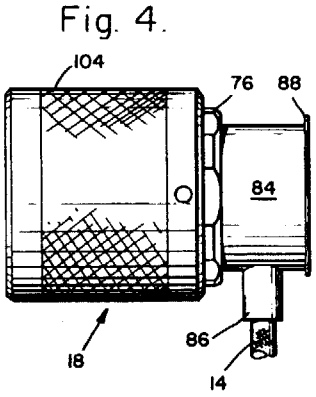
FIG. 4 is a side view of the plug section of the connector showing said recepatcle in the unmated condition.
Figure 5:
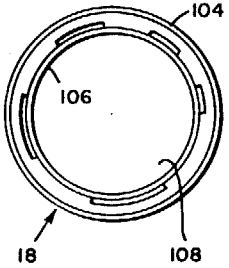
FIG. 5 is an end view of the mating face of the plug section of FIG. 4.
Figure 3:
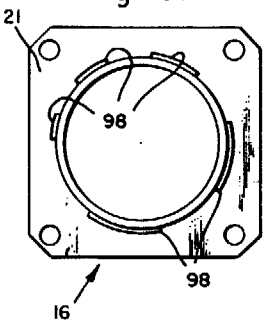
FIG. 3 is an end view of the mating face of the receptacle section of FIG. 2.
Figure 2:
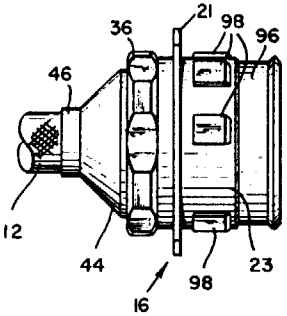
FIG. 2 is a side view of the receptacle section of the connector showing said plug section in the unmated condition.
Figure 1:
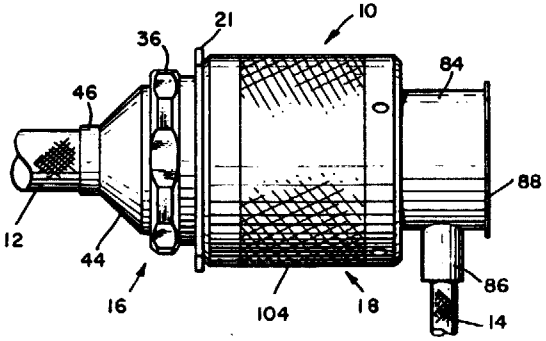
FIG. 1 is a side view of an electrical connector embodying one form of the present invention and showing the two sections thereof in a fully mated condition.

The present invention is particularly adapted to be embodied in an electrical connector 10 for interconnecting the various individual wires or conductors in a first cable 12 with the corresponding wires or conductors in a second cable 14. The connector 10 includes two separate parts which may be readily mated or unmated. The first part is referred to herein as the receptacle section 16 whereas the second part is referred to as the plug section 18.

The receptacle section 16 includes a shell 20. The exact shape, size, configuration, etc., of the shell 20, of course, depends upon the intended use for the connector 10. In the present instance, by way of example, the receptacle section 16 is intended to be permanently mounted in a fixed position for example on a bulkhead 22. Accordingly, the shell 20 includes a mounting flange 21 which is adapted to be secured by screws, bolts, etc., to the bulkhead 22 whereby the front or barrel 23 of the receptacle section 16 extends outwardly from the bulkhead 22.

The shell 20 is essentially a cylindrical, hollow member. Although the shell 20 may be made of any desired material, it is preferably electrically conductive and fabricated from a light-weight metal such as aluminum.

A passage 24 extends axially through the shell 20 from one end to the other. In the present embodiment this passage 24 is substantially cylindrical with a uniform diameter over its entire length.

An insulating structure 26 is provided inside of the passage 24 for retaining the electrical contacts in position. Although this structure 26 may be a single member, in the present instance it is formed by two separate inserts 28 and 30. The inserts 28 and 30 include a large number of small openings extending axially therethrough. When the inserts are secured in position end-to-end, the passages are aligned with each other and are adapted to retain the wires in the cable 12 and the suitable electrical contacts 32 in position. Although these contacts 32 may be of any desired variety, in this particular embodiment of the receptacle section 16 the contacts 32 are of the so-called socket variety adapted to mate with complementary pin contacts in the plug section 18.

The individual wires or conductors in the cable 12 extend through the back ends of the passages and are electrically connected to the respective contacts 32.

It has been highly desirable to provide some form of protection against dirt, dust, moisture, etc., entering into the connector and particularly entering in and around the region of the contacts. In the present instance this is accomplished by means of a seal 34. The seal 34 includes a resilient material such as silicone rubber, etc., and is adapted to fit snugly into the passage 24 and against the rear of the insert 30.

The seal 34 includes a large number of small openings which are aligned with the openings in the inserts. Accordingly, the conductors from the cable 12 can pass the seal 34 and be connected to the contacts 32. This seal 34 is then effective to prevent dirt, dust, moisture, etc., from entering into the interior of the connector.

Retaining means are provided for securing the various parts of the receptacle section 16 in position. Although the retaining means may be of any desired variety, it includes a collar or nut 36 on the rear end of the shell 20. In this embodiment the nut 36 is threaded onto the exterior of the shell 20 whereby it may be tightened down onto the shell and compress the various elements together.

To assist in this compression and to improve the action of the seal, a pressure or backing plate 38 is provided. The pressure plate 38 includes a planar center portion 40 which bears directly upon the rear of the seal 34. The center portion 40 includes a plurality of small openings which allow the conductors to pass therethrough.

The pressure plate also includes a cylindrical rim which slidably fits into the passage 24 and a radial flange which fits over the end of the shell. When the nut 36 is tightened onto the shell 20, it engages the flange and forces the entire pressure plate toward the end of the shell 20. This action is effective to clamp all of the parts in position and also to axially compress the seal 34 against the insert 30.

Since the seal 34 is made of a noncompressible material such as a silicon rubber, when the pressure plate 38 is forced against the seal 34 it causes the material in the seal to flow radially in all directions. It flows against the passage 24 and the conductors, etc. This in turn insures an intimate, high pressure contact against all of the surfaces whereby a high degree of sealing is insured.

It is usually highly desirable in this type of connector to provide some form of electrical grounding or shielding to prevent electromagnetic interference, etc. The cable 12 normally includes an electrically conductive outer jacket 42 which acts as the shielding for the cable 12. It is essential that the shielding on each of the cables be electrically connected thrugh the connector 10 to the other cable.

In order to accomplish this a back shell 44 is provided on the connector. The back shell 44 is normally a thin housing of electrically conductive material. An extension or reduced neck 46 extends along the cable and is interconnected with the electrically conductive shielding on the cable. A cylindrical portion 48 of the back shell 44 extends through the nut and has a radial flange which seats on the flange for the pressure plate 38.

The combination of the electrically conductive back shell 44 and the electrically conductive shell 20 provides a low resistance electrical path from the shielding on the cable. This is effective to provide a high degree of shielding against electromagnetic interface. However, it has been found that under some circumstances and particularly at the higher frequencies it may be desirable to provide a higher or more complete degree of shielding.

To increase the amount of shielding, in the present instance a sleeve or liner 50 is provided inside of the receptacle section 16. The liner 50 fits snugly in the passage 24 through the shell 20 and the inserts 28 and 30 fit snugly inside of the liner 50.

The front end of the liner 50 includes a radially inwardly directed flange 52. This flange 52 fits over the end of the insert 28 and forms a stop that prevents the inserts 28 and 30 moving axially therepast.

A flange on the opposite end of the liner 50 extends over the rear end of the shell 20. When the nut 36 is tightened onto the shell 20, it clamps all of the flanges on the liner 50, pressure plate 38 and the back shell 44 tightly against each other and the end of the shell 20. This ensures all of the parts being tightly mechanically fastened together and electrically interconnected.

The back shell 44, the pressure plate 38 and the inner liner 50 are all made from a highly electrically conductive material such as brass. These three highly conductive members completely encase the conductors from the cable, the contacts, etc., and provide a high degree of shielding. It is to be noted that the inner surface of these members are all free from any irregularities which might form an impedance, wave trap, etc., to high frequency currents.

The barrel 23 of the shell 20 has a generally cylindrical shape which projects from the bulkhead 22 at substantially right angles thereto. As will be explained in more detail subsequently, the plug section 18 of the connector 10 is adapted to be fitted over the barrel 23 when the two sections 16 and 18 are mated.

The plug section 18 includes an inner shell 54 somewhat similar to the shell in the receptacle section 16. The shell 54 is a generally cylindrical member having a passage 56 extending axially therethrough. Although the passage 56 is generally cylindrical, it is subdivided into two separate parts by a forwardly facing radial shoulder 58. The first or outer part 60 of the passage 56 has an enlarged diameter. The second or inner part 62 has a reduced diameter. The enlarged portion 60 of the passage 56 is adapted to snugly fit over the barrel 23 on the shell 20.

An insulating structure 64 is provided in the smaller portion 62 of the passage 56. The insulating structure 64 may be similar to the first insulating structure 26 and includes a front insert 66 and a rear insert 68. Although the contacts 70 may be of any desired variety, they preferably mate with the contacts 32 in the receptacle section 16. In the present instance each of the contacts 70 include a long slender pin 71. Each of these pins 71 extends from the face of the front insert 66 whereby they project into and mate with the socket contacts 32.

The individual wire or conductors in the second cable 14 extend through the openings in the rear insert 68 and are connected to the contacts 70. It can thus be seen that by joining the two sections 16 and 18 all of the individual wires in each of the cables 12 and 14 are electrically interconnected with the respective individual wires in the other cable.

The rear of the plug section 18 includes a resilient seal 72 similar to the seal 34 in the receptacle section 18. A pressure plate 74 is also provided for tightly compressing the seal 34 against the wires, etc., to keep out dust, dirt, moisture, etc. A nut 76 is threaded onto the exterior of the shell 54 and forces the pressure plate 74 against the seal 34.

It has also been found very desirable to provide some form of sealing between the two mating faces on the front inserts 28 and 66. In the present instance this includes a thin wafer 78 of an elastomeric material such as silicone rubber, etc. The wafer 78 includes a large number of small openings which register with the openings in the inserts 28, 30, 66 and 68 to allow the pins 71 to extend therethrough. It has been found desirable for the pins 71 to be a snug fit in these openings whereby the wafer 78 will normally remain on the face of the plug section 18. When the two sections 16 and 18 are fully mated, the thin wafer 78 is compressed between the faces of the two inserts 26 and 66. As a result the elastomeric material in the wafer 78 tends to flow into and against all of the surfaces and thereby provides a complete and effective sealing action.

The plug section 18 includes an electrical grounding or shielding generally similar to that in the receptacle section 16. More particularly, an inner sleeve or liner 80 is provided in the inner portion 62 of the passage 56. The liner 80 includes a radial flange 82 which fits over and around the end of the insert 66. The rear of the liner 80 fits over the end of the shell 54 and is clamped in position by the nut 76. This prevents the inserts 66 and 68, etc., from sliding forwardly through the shell 54.

A back shell 84 is provided on the rear of the shell 54. This may be identical to the back shell 44 on section 16. However, in this embodiment it is somewhat different. The back shell 84 includes a cylindrical housing having its inner end clamped against the end of the shell 54 by the nut 76.. An extension or neck 86 extends at right angles to the housing. The shielding on the cable 14 is electrically connected to this neck and the wires from the cable are bent at right angles and connected to the contacts 70. A cover 88 on the end of the housing may be removed to allow ready access to the wire, contacts, etc., for inspection and servicing, etc.

It can be seen that when the two sections 16 and 18 are fully mated all of the wires, contacts, etc., are completely enclosed within a continuous electrically conductive path from the shielding on one cable all the way to the shielding on the other cable. This is very effective to insure a very high degree of shielding against any stray electromagnetic energy which may be incident upon the connector 10. However, it has been found under some extreme circumstances that a certain amount of difficulty may arise particularly when the incident energy is of extremely high frequencies.

To avoid this difficulty it is desired for the wafer seal between the inserts 28 and 66 to be of the type disclosed and claimed in U.S. Pat. No. 3,597,724 entitled "CONNECTOR" filed in the name of John J. Phillips and assigned of record to G & H Technology, Inc. More particularly, a resilient metal rim or ring 90 encompasses the periphery of the resilient wafer 78. The ring 78 is a highly conductive metal and has a U-shaped cross section which fits over the opposite sides of the periphery of the wafer 78. This tends to clamp the periphery of wafer 78 therebetween.

When the plug section 18 and the receptacle section 16 are mated, the flanges 52 and 82 on the ends of the two liners 50 and 80 engage the metal rim or ring 90 and compress it therebetween. It has been found desirable to cut several slots 92 into one or both sides of the rim 90 and thereby form a plurality of resilient fingers 94. These fingers 94 permit the rim 90 to be compressed betwen the flanges 52 and 82 on the ends of the liner sleeves 50 and 80.

The elastomer in the thin wafer seal 78 is, in reality, incompressible. As a result when the wafer seal 78 is compressed between the faces of the inserts 28 and 66, it tends to flow radially outwardly toward the interior of the rim 90. However, since the rim 90 fits snugly onto the periphery of the waver 78 this tendency to flow radially outwardly is opposed by the axial compression of the rim 90. This assists in insuring that the axial forces compressing the rim and the axial forces compressing the wafer seal 78 provide a highly effective sealing action and a highly effective electrical connection.

Figure 6:
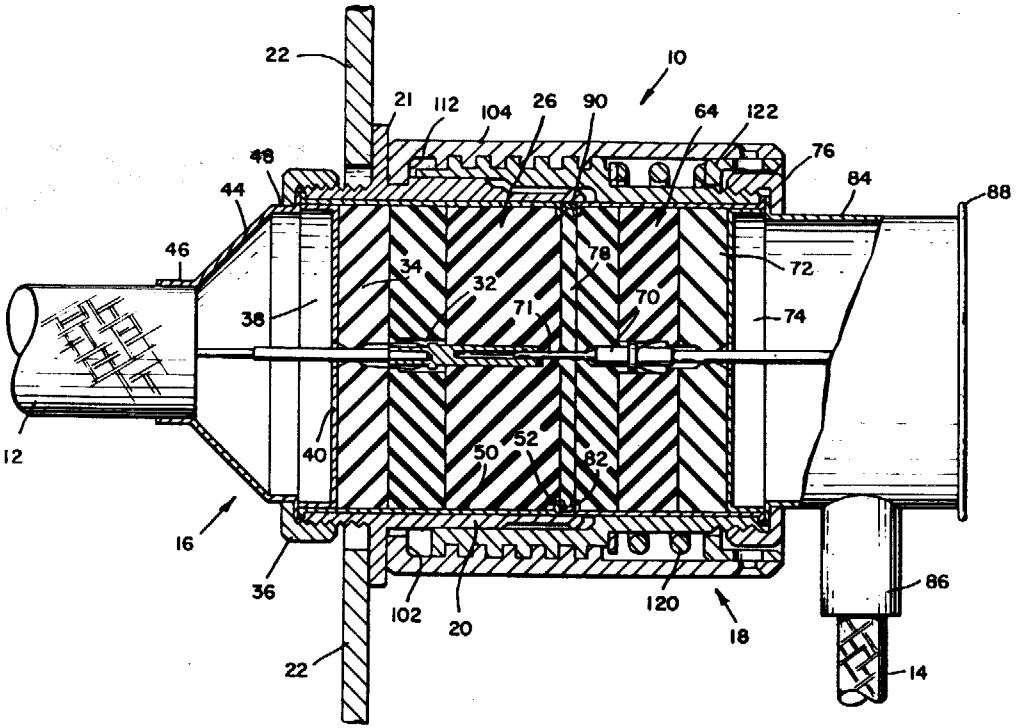
FIG. 6 is a cross-sectional view (on a somewhat enlarged scale) of the mated connector of FIG. 1.
Figure 7:
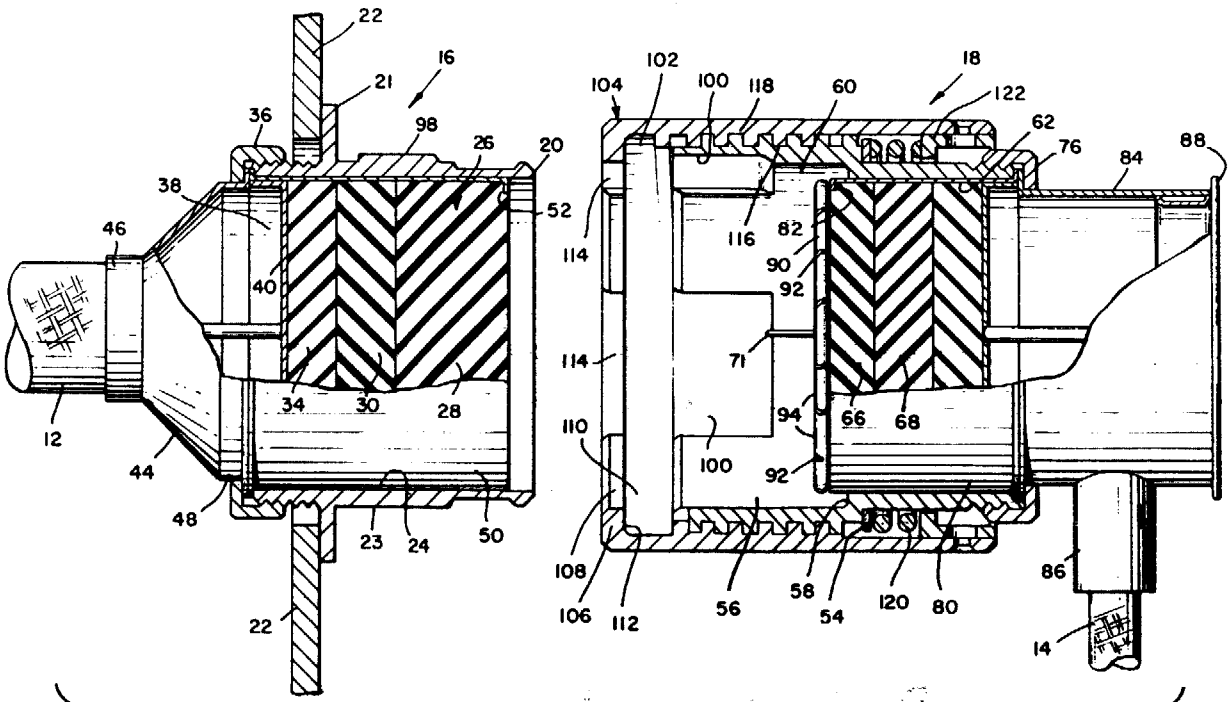
FIG. 7 is a cross-sectional view (on the same scale as FIG. 6) of the receptacle section and the plug section, said sections being positioned and in condition to mate with each other.
Figure 11:
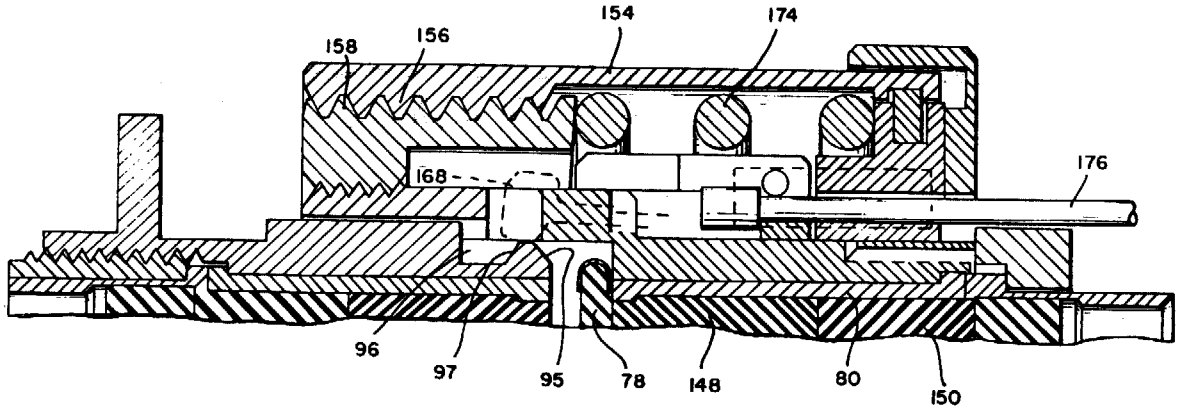
FIG. 11 is a fragmentary cross-sectional view of the connector shown in FIG. 9.

It can be seen from FIG. 6 that when the two sections 16 and 18 are fully mated the internal structure of the connector is "trapped" between the two pressure plates 38 and 74. The compressive loads from the pressure plates 38 and 74 are applied to the two seals 34 and 72, the insulating structures 26 and 64, the wafer seal 78 and the ring 90. Since these elements are somewhat free to "float" inside of the two shells 20 and 54, the forces are distributed throughout the interior and they are all uniformly loaded and seated. This in turn insures an optimum sealing action.

In addition this insures a very large compressive force between the electrically conductive surfaces on the flanges 52 and 82 and the conductive surfaces on the rim 90. This forms a low resistance path from the shielding on cable 12, the back shell 44, the inner liner 50, the rim 90 on the gasket seal, the other inner liner 80, the back shell 84 and the shielding on the cable 14.

When the receptacle section 16 and the plug section 18 are mated, the barrel 23 extends into the enlarged portion 60 of the passage 56. Preferably, the exterior surface of the barrel 23 is an extremely close and snug fit with the internal surface of the enlarged portion 60 of the passage 56.

As a consequence, if there is any axial misalignment between the plug section 16 and the receptacle section 18 particularly during their initial portion of their mating or the last portion of the separation, an extreme and very severe binding may occur. In fact this may be of such a nature as to cause them to jam or freeze together.

In order to avoid these difficulties an annular recess 96 may be cut into the barrel 23 immediately adjacent the end thereof similar to that disclosed in U.S. Pat. No. 3,336,562 entitled "LOW SEPARATION FOR ELECTRICAL CONNECTOR" filed in the name of Larry L. McCormick et al and assigned of record to G & H Technology, Inc. This annular recess 96 provides a clearance space which allows mating even extremely close fitting parts without any binding occurring.

The receptacle section 16 and the plug section 18 are preferably "polarized" whereby they can only mate in one unique angular orientation. In the present instance, this is accomplished by providing a plurality of projections or keys 98 on the exterior of the barrel 23. In addition, a plurality of cutouts or key-ways 100 and 114 are provided on the inside of the mating passage. The keys 98 and key-ways 100 and 114 are preferably asymmetrically distributed and vary in width to allow their mating in only one unique position.

The portion of the plug section 18 described so far will mate properly with receptacle section 16 and provide an effective electrical interconnection between the two cables 12 and 14. However, it is preferable to provide additional means to facilitate the mating of the two sections and/or to insure their remaining securely locked together.

In the present instance a so-called breech lock 102 is provided for securing the two sections together. The lock 102 includes a nut or outer sleeve 104 rotatably disposed around the outside of the shell 54. The end of the sleeve 104 projects beyond the end of the shell 54 and includes a flange 106 that projects radially inwardly. The flange 106 forms an opening 108 which is just barely large enough to allow the barrel 23 to pass therethrough. The interior of the sleeve 104 is undercut immediately behind the flange 106 to form an annular channel 110 and a radial shoulder 112.

A plurality of key-ways 114 is cut through the flange 106. These key-ways 114 are aligned with the key-ways 100 cut into the surface of the passage 56 and/or to register with the keys 98 projecting from the barrel 23 on the receptacle shell 20.

It can be appreciated that with a breech lock 102 of this nature the plug section 18 is fitted over the barrel 23 of the receptacle section 16 and moved axially toward the bulkhead 22. When the plug section 18 is in position, the flange 106 on the end of the sleeve 104 abuts the mounting flange 21. The sleeve 104 is then rotated until the shoulder 112 moves behind the ends of the projections or keys 98. This requires a small fraction of a turn, for example, approximately $\frac{1}{8}$ of a rotation.

When the shoulder 112 is behind and engages backsides of the keys 98, it is effective to lock the two sections 16 and 18 firmly together.

It should be noted that the shoulder 112 and the ends of the keys 98 are all in a common radial plane. Accordingly, the movement of the shoulder 112 behind the keys 98 does not produce an axial force or movement. In other words, the beech lock 102 does not tend to "screw" the two sections 16 and 18 together *i.e. zero pitch*. Instead, it merely locks them together. Conversely, to release or unmate the two sections the sleeve 104 is merely rotated until the shoulder 112 is no longer behind the keys 98.

The keys 98 and the key-ways 100 may be arranged such that the mating surfaces have extended circumferential lengths. Because of this extended length of the mating surfaces, even a relatively small height on the shoulder 112 and the keys 98 insures a very large area of contact for the breech lock. This large contact area insures a very low stress between the mating surfaces. This in turn insures a lock which is easy to manually work and which does not wear, etc.

It can be appreciated that this breech lock 102 provides a very simple and fast-mating action. It also provides a very large bearing area to carry the load and reduce the stress into a workable range. Although the breech lock 102 is effective to allow the two sections 16 and 18 of the connectors 10 to be easily mated and unmated, it is also effective to keep the two sections securely mated during all operating conditions. However, it has frequently been found desirable to provide additional means for insuring all of the individual electrical contacts 32 and 70 within the connector are placed in proper electrical engagement and maintained in full electrical engagement at all times.

In the present instance this is accomplished by providing means for retracting the shell 20 into the plug section 18 while it is in the unmated condition and conversely for extending the shell 20 when it is in the mated condition. A set of threads 116 on the outside of the shell 54 engages a set of complementary threads 118 on the inside of the sleeve 104.

When the sleeve 104 is rotated about the shell 54, the shell 54 will be advanced or retracted axially of the sleeve 104 depending upon the direction of rotation. The threads 116 and 118 preferably have a very high pitch; i.e., the amount of axial movement is very large for a small amount of rotation. By way of example, the pitch of the threads 116 and 118 should be large enough to move the shell 54 between the fully retracted position and the fully extended position when the sleeve is rotated through a small fraction of a turn. Normally this is about the smallest amount of rotation required to operate the breech lock 102.

Figure 8:
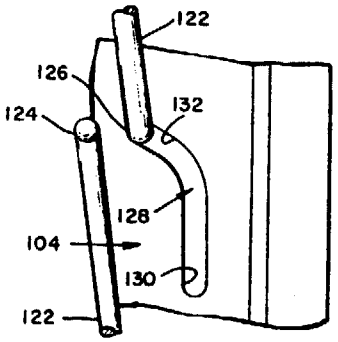
FIG. 8 is a fragmentary view of a portion of the plug section but showing a modified form of a biasing spring.

When the plug section 18 is unmated as seen in FIG. 8, the shell 54 is fully retracted into the sleeve 104. The pin contacts 70 are thus withdrawn into the interior of the plug section 18 and protected from damage.

When the plug section 18 is initially mated with the receptacle section 16, the pin contacts 70 are retracted and prevented from hitting the end of the barrel 23, etc. During this initial phase of the mating, the two sections 16 and 18 are usually skew or otherwise misaligned. If the pins 70 are engaged under such conditions, they will be damaged by bending, etc. If the contacts are kept separated until after the end of the two sections 16 and 18 are sufficiently mated to insure a very accurate axial alignment, they will not be damaged and will mate properly.

After the two sections 16 and 18 have been axially pushed together and are fully mated, the sleeve 104 is rotated whereby the breech lock 102 is fully secured. During this rotation of the sleeve 104 the threads 116 and 118 advance the shell 54 forward toward the shell 20. The distance of this travel is sufficient to fully mate the pin contacts 70 with the socket contacts 32 and compress the wafer seal 78 between the two faces of the inserts 28 and 66.

A spring 120 may be provided inside of the sleeve 104 to assist in locking the connector and retaining it locked. The spring 120 is trapped between a collar 122 on the inside of the sleeve 104 and a shoulder on the shell 54. This spring 120 exerts an axial force on the shell 54 and biases it toward the shell 20. The combination of the thrust from the spring 120 and the high pitch of the threads 116 and 118 insures the two sections 16 and 18 and the electrical contacts 32 and 70 always being completely locked together.

The combination of the high pitch of the threads 116 and 118 and the axial force from the spring 120 results in a torque being created. This torque tends to rotate the sleeve 102 about the shell 54. The direction of this torque is selected to assist in rotating the sleeve 104 in the direction which maintains the breech lock in the locked condition. The force from the spring 120 also assists in maintaining all of the contacts fully engaged.

It can be seen several advantages are obtained from the high pitch threads 116 and 118 and the spring 120. First of all, the resultant torque tends to assist the operator in mating the two sections 16 and 18. In particular, it assists in twisting the sleeve 104 to extend the shell 54 and mate the contacts 70 and 71. The amount of torque produced may be made as high as desired to facilitate the mating of the sections. However, since this torque assists in the mating, it opposes turning the sleeve when unmating the sections and therefore makes that a somewhat more difficult step.

Secondly, even though the connector 10 may be subjected to vibrations, etc., the torque biases all of the parts together. In particular, the spring applies a torque that keeps the breech lock 102 in the fully locked position. In fact, it has been found that an adequate torque can be maintained to eliminate the necessity for using a keeper wire, etc., for securing the sections together.

In addition, as the various resilient seals, etc., gradually deteriorate, take on a set, etc., the torque continues to screw the sections together whereby they are always maintained fully mated. It has been found desirable for the high pitched threads 116 and 118 to be of the square or acme variety and to have a certain amount of axial clearance between the mating surfaces. This clearance allows a limited amount of "float" to be present. As a consequence, the biasing action is highly effective in maintaining all of the various seals, and particularly the wafer seal, fully compressed.

The breech lock 102 is effective to fully secure the two sections 16 and 18 together. Therefore, even though the spring 120 provides a resilient biasing action and even though there is some "play" between the threads 116 and 118, there is no mechanical "play," etc., in this lock 102. The biasing action of the spring 120 merely parallels the fastening action of the breech lock 102 and does not provide any resilience in the locking action. Accordingly, before an accident can pull the sections 16 and 18 apart, it is necessary to destroy the lock 102. Therefore, even in the event of any abnormal forces, i.e., vibration, impact, etc., the sections 16 and 18 and all of the electrical contacts 32 and 70 will be retained completely locked together.

The foregoing spring 120 exerts an axial load on the threads 116 and 118 whereby a torque is created on the sleeve 104. As an alternative it has been found a torsion spring may be employed for creating a torque between the sleeve 104 and the shell 54. This in turn creates the same type of sealing action, etc., previously described.

An embodiment employing a torsion spring 122 of this nature is illustrated in FIG. 8. One end 124 of the torsion spring 122 is secured to the shell 54 while the other end 126 is secured to the sleeve 104. It has been found the largest amount of torque is required when the sleeve 104 occurs during the terminal portion of the locking operation, i.e., that portion of the twisting of the sleeve 104 when the contacts 132 and 70 are actually mating with each other. Moreover, when the connector is locked together it is only during this terminal increment that it is necessary to insure retaining the contacts 32 and 70, etc., fully mated.

Accordingly, it has been found desirable to slidably anchor the end 124 of the spring 122 in a recessed cam 128. The initial contour 130 of this cam 128 matches the axial movement of the shell 54 as it is advanced through the sleeve 104. As a result both ends of the spring 122 move at essentially the same rate and the torsion on the spring 122 is essentially constant. However, during the terminal phase of the locking operation the slope of the cam surface 132 varies. This variation in the slope causes the spring 122 to produce a much larger torque which biases the shells 20 and 54 and contacts 32 and 70 together. Moreover, it causes the spring 122 to continually exert a large torque which retains the two sections of the connector fully mated.

The combination of the cam surface 132 and torsion spring 122 can be effective to greatly reduce the amount of travel of the spring 122. This in turn reduces the weight, size, etc., of the spring 122. Also, the forces imposed by the spring 122 may be reduced.

Figure 9:
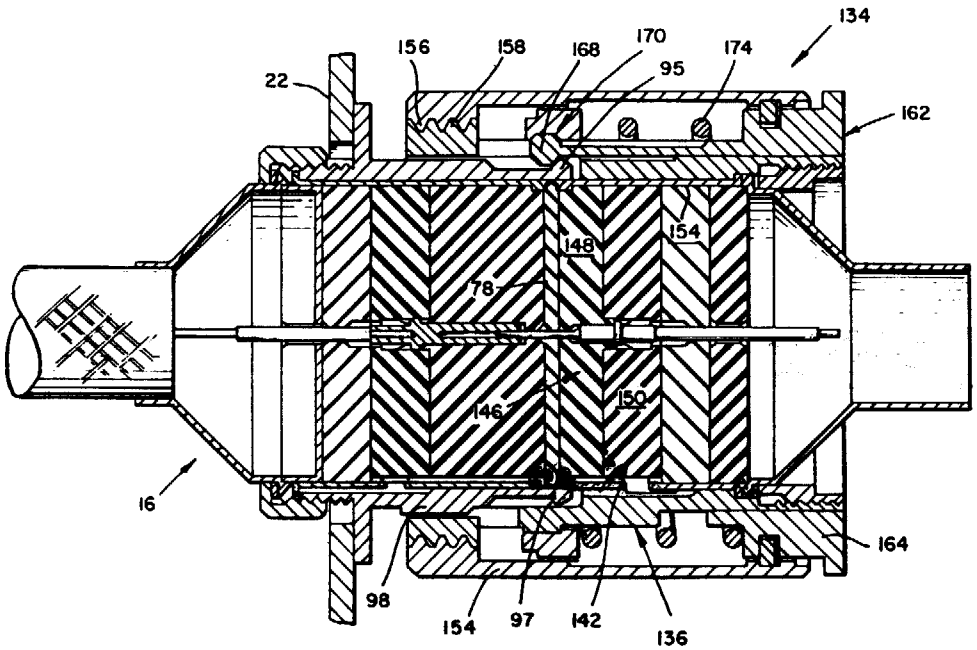
FIG. 9 is a cross-sectional view (similar to and on the same scale of FIG. 6) of a mated connector having another embodiment of the plug section.
Figure 10:
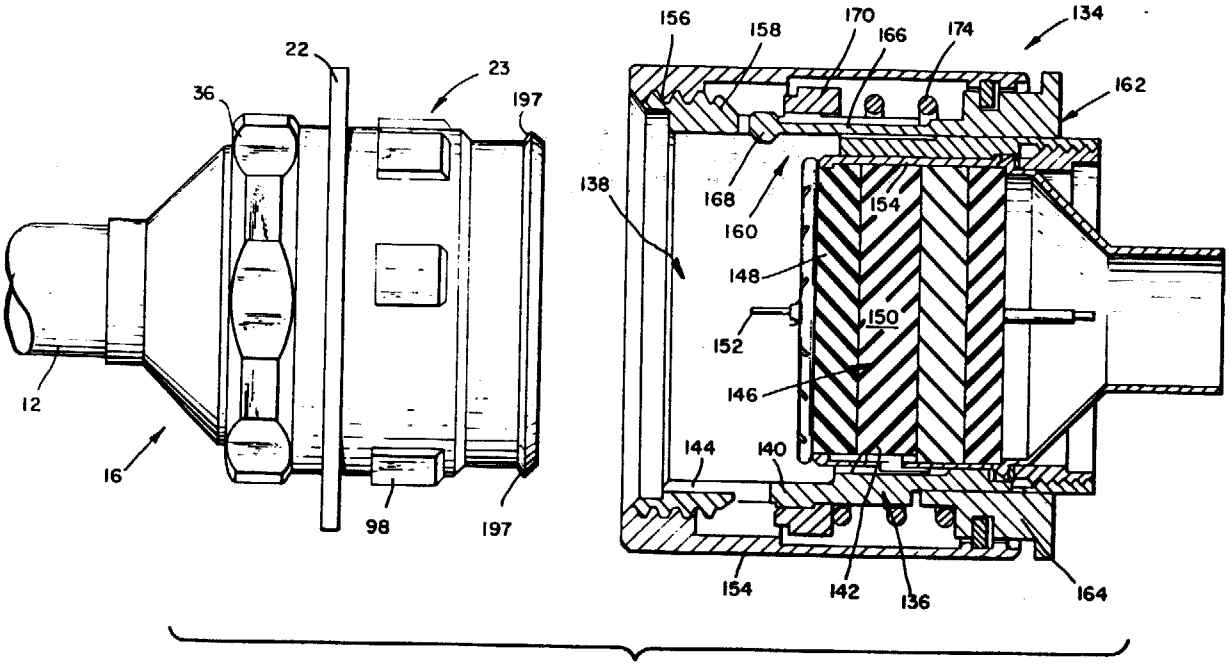
FIG. 10 is a cross-sectional view similar to FIG. 8 showing an unmated connector with the other embodiment of the plug section.

As an alternative the embodiment of the connector 132 shown in FIGS. 9 and 10 may be used. In the present instance, the receptacle sections 16 in both embodiments are identical.

More particularly, the receptacle section 16 is mounted upon a bulkhead 22 whereby the barrel 23 of the shell 54 projects from the bulkhead 22. A plurality of keys 98 are circumferentially spaced around the barrel 23 and polarize the mating of the two sections 16 and 18.

The barrel 23 includes an annular channel or recess 96 which extends around the barrel 23. The recess 96 is formed inside of an annular ridge 95 at the very end of the barrel 23. The ridge 95 in turn includes an annular shoulder 97. This shoulder 97 extends completely around the end of the barrel 23 and defines one side of the channel or recess 96.

The plug section 134 is generally similar to the plug section 18 in that it includes a shell 136 having a passage 138 extending axially therethrough. The passage 138 includes an outer portion 140 having an enlarged diameter and an inner portion 142 of reduced diameter.

The enlarged portion 140 is adapted to fit over the end of the barrel 23. It includes a plurality of key-ways 144 which are positioned to mate with the keys 98 on the exterior of the barrel 23.

An insulating structure 146 is disposed inside of the smaller portion 142 of the passage 138 through the shell 136 and includes a pair of inserts 148 and 150. Pin contacts 152 are mounted in the two inserts 148 and 150 and positioned to mate with the socket contacts 32 in the receptacle section 16.

A cylindrical sleeve 154 is rotatably disposed upon the outside of the shell 136. This sleeve 154 is generally similar and/or analogous to the sleeve 104 in the first embodiment in that it controls the axial position of the shell 136 (i.e., fully extended to mate the contacts and secure the two sections together or fully retracted to separate the contacts and release the two sections 16 and 134.

The interior of the sleeve 154 includes a set of threads 156 which mate with a similar set of threads 158 on the exterior of the shell 136. These threads 156 and 158 are preferably "fast threads," i.e., they have a high pitch. When the sleeve 154 is rotated through a small portion of a turn (for example approximately $\frac{1}{4}$ or $\frac{1}{3}$ of a turn) the shell 136 advances between its fully extended position as shown in FIG. 9 and it fully retracted position as shown in FIG. 10.

A lock 160 is provided for securing the two sections 16 and 134 together. In this embodiment the lock 160 includes a retainer 162. The retainer 162 has a generally cylindrical section 164 which is slidably disposed upon the exterior of the shell 136. A plurality of resilient fingers 166 are formed on the retainer 162 and project axially along the shell 136. The end of each finger 166 includes an enlargement 168.

Each of the enlargements 168 is tapered to mate with the ridge 95. When the two sections 16 and 134 are initially mated, the end of the shell 136 slides axially along the exterior of the shell 20. As this movement progresses the keys 98 pass through the key-ways 144 and the enlargements 168 ride up and over the ridge 95. When the two sections 16 and 134 are fully mated, the enlargements 160 have passed over the ridge 95 and have dropped down into the annular channel or recess 96 and engage the annular shoulder 97 on the inside of the ridge 95.

A collet ring 170 is slidably disposed on the outside of the shell 136. It includes an annular shoulder 172 on the inside thereof. When the shell 136 is fully retracted, it engages the shoulder 172 and retains the collet ring 170 retracted.

When the shell 136 is extended, the collet ring 170 is also allowed to move into the extended position. As it moves toward the extended position, it passes over the outside of the enlargements 168 and completely surrounds them. The inside of the collet ring 170 is a snug fit on the outside of the enlargements 168.

Eventually the shoulder 172 engages the enlargements 168 whereby the collet ring 170 cannot move any further. At this point the enlargements 168 are prevented from moving radially outwardly by the snug fitting collet ring 170. As a consequence, the enlargements 168 are retained locked onto the shoulder 97 formed by the ridge 95. This is effective to securely lock the two sections 16 and 134 together.

In order to use this embodiment of the connector, the plug section 134 is first brought into the axially aligned position shown in FIG. 10. The key-ways 144 on the plug section 134 are then aligned with the keys 98 on the receptacle section 16. The plug section 134 is then forced axially onto the receptacle section 16. During this axial movement, the end of the shell 136 slides over the barrel 23 and the enlargements 168 on the ends of the fingers 166 ride up and over the ridge 95 and down into the annular channel or recess 96.

The sleeve 154 is then rotated whereby the shell 136 is advanced axially through the sleeve 154. This motion causes the contacts 32 and 152 to mate, etc. It also causes the collet ring 170 to slide over the outside of the enlargements 168 on the ends of the fingers 166. Since the collet ring 170 fits snugly around the fingers 166, the enlargements 168 cannot expand outwardly and are securely locked onto the end of the barrel 23.

A spring 174 is trapped between the retainer 162 and the collet ring 170. It then produces an axial thrust which tends to advance the shell 136 into the extended position. As a result it assists the operator in turning the sleeve 154 and locks the two sections together.

In order to release the two sections 16 and 134, the sleeve 154 may be rotated in the opposite direction. This moves the shell 136 into the fully retracted position and separates the contacts 32 and 154. It also moves the collet ring 170 into the retracted position whereby the fingers 166 and the enlargements 168 thereon become free to move radially outwardly. The plug section 134 is thus freed to be pulled axialy off the receptacle section 16.

Under some circumstances, it may be desirable to rapidly separate the two sections 16 and 134 and/or to separate them by remote control. In this event a device such as a lanyard 176 may be secured to the collet ring 170. By pulling on the lanyard 176 the collet ring 170 is moved to its retracted position. The enlargements 168 are thus freed whereby they can ride over the ridge 95. As a consequence, the two sections 16 and 134 can be separated without ever rotating the sleeve 154.

We claim:

[1. An electrical connector including the combination of a plug section, a first set of electrical contacts on said plug section, a receptacle section effective to mate with said plug section, a second set of electrical contacts on said receptacle section, one of said sets of contacts being movable within its section between a first position wherein the contacts therein mate with the contacts in the other set when said sections are mated and a second position wherein the contacts therein do not mate with the contacts in the other set, and a set of mating threads on one of said sections to mesh with each other, said threads having a high pitch to cause the movable set of contacts to move from the second position into the first position in response to partial rotation in one direction and to cause the movable set of contacts to move from the first position into the second position in response to a partial rotation in an opposite direction.]

[2. The connector of claim 1 including a spring effective to coact with said threads, said spring having a sufficient force and said threads having a sufficiently high pitch to create a torque tending to rotate said threads relative to each other and retain said sections and the contacts in said sets fully mated together.]

[3. An electrical connector including the combination of a plug section, a first set of electrical contacts in said plug section, a receptacle section, a sleeve member in one of said sections, a shell member on said sleeve member, said shell member being axially movable relative to said sleeve member between a fully retracted and unmated position and a fully extended and mated position, a second set of electrical contacts in said receptacle section carried with said shell between a retracted position and an extended position, the contacts in said second set mating with the contacts in the first set when in the extended position and not mating with the contacts in the first set when in the retracted position, and a set of screw threads on said sleeve member and shell member for moving said shell members between said mated and unmated positions, said threads having a high pitch to cause the sleeve member to move said shell member between said fully retracted position wherein the contacts in said sets are retracted and said fully extended position wherein the contacts in said sets are mated in response to only a partial turn of the sleeve member.]

[4. The connector of claim 3 including a spring effective to coact with said threads, said spring having sufficient force and said threads having a sufficient pitch whereby one of said members tends to rotate and move said shell member and the second set of contacts into the extended and fully mated position.]

5. An electrical connector including the combination of a plug section, a first set of electrical contacts in said section, a receptacle section, said receptacle section being effective to mate with said plug section, a second set of electrical contacts in said second section, a *zero pitch* breech lock on said sections effective to releasably secure said sections together when they are mated, and means operatively interconnected with said breech lock for moving one of said sets of contacts into and out of engagement with the other of said sets of contacts when said breech lock secures said sections together and releases them from each other.

6. An electrical connector including the combination of a plug section, a first set of electrical contacts in said plug section, a receptacle section, a second set of electrical contacts in said receptacle section, said receptacle section being adapted to mate with the plug section whereby the electrical contacts in said first set mate with the electrical contacts in said second set, a *zero pitch* breech lock on said sections adapted to releasably secure said sections together when they are mated with each other, and a set of mating screw threads on one of said sections for moving one of said sets of electrical contacts into and out of mating engagement with the other set of contacts.

7. An electrical connector including the combination of a plug section, a first set of electrical contacts in said plug section, a receptacle section, a second set of electrical contacts in said receptacle section, said receptacle section being adapted to mate with the plug section whereby the electrical contacts in said first set mate with the electrical contacts in said second set, a *zero pitch* breech lock including a member movably mounted on one of said sections for releasably engaging the other of said sections, said member being rotatably movable in a first direction into a first angular position and in a second direction into a second angular position, said member when in the first angular position being effective to securely lock said sections together in the mated position and when in the second angular position allowing said sections to freely mate and unmate, a mating set of screw threads on one of said sections for moving the set of electrical contacts thereon into electrical mating engagement with the other set of electrical contacts when rotated in said first direction and out of engagement when rotated in said second direction, and resilient spring means effective to react with said threads of bias said member toward said first angular position.

8. An electrical connector including the combination of a plug section, a first set of electrical contacts on said plug section, a receptacle section adapted to mate with said plug section, a second set of electrical contacts on said receptacle section, one of said sets being movable between a first position wherein said contacts are electrically mated and a second position wherein they are electrically unmated, a *zero pitch* breech lock on said sections including a plurality of circumferentially spaced detent means on one of said sections and a movable member on the other of said sections, said movable member being rotatable between a first angular position wherein it engages the detent means and a second angular position wherein it does not engage said detent means, resilient spring means effective to bias said movable member toward said first angular position, and means operatively coupled to said breech lock and to said movable set of contacts for moving said set into the first mated position when said movable member is in said first angular position and into the second unmated position when said movable member is in said second angular position.

9. An electrical connector including the combination of a first member, a first set of electrical contacts in said member, a second member, said members being adapted to mate with each other, a second set of electrical contacts in said second member, a plurality of keys on one of said members and a plurality of key-ways on the other of said members, said keys and key-ways being positioned to complement each other when said members are mated together, a *zero pitch* breech lock having detent means on one of said members and a keeper on the other of said members, said keeper being rotatably movable between a first position wherein it engages the detent means and a second position wherein it does not engage the detent means, and means on one of said members for moving the set of contacts on one of said members into engagement with the set of contacts on the other of said members when said keeper is rotated into said first position and for moving it out of engagement when said keeper is rotated into said second position.

10. An electrical connector including the combination of a first section, a first shell in said first section, a first set of electrical contacts in said shell, a second section, a second shell in said second section, said second shell being movable between an extended position and a retracted position, a second set of electrical contacts in said second shell, the electrical contacts in said second set mating with the electrical contacts in said first set of contacts when said shell is in the extended position, the electrical contacts in said second set being separated and electrically isolated from the contacts in the first set when said shell is in the retracted position, a sleeve rotatably mounted on the second shell, a first annular array of shoulders on said sleeve, a second annular array of shoulders on said first section, the shoulders in said second array being circumferentially spaced and positioned to engage the shoulder in said first array and secure said sections together, said *second array of* shoulders being separated by a plurality of openings and positioned to allow said *first array of* shoulders to pass therethrough when the sleeve is rotated into a first angular position and to engage the *first array of* shoulders when it is rotated into a second angular position, *the rotation of said sleeve being at zero pitch* and means for moving said second shell into said retracted position when said sleeve is rotated into said first angular position and into the extended position when said sleeve is rotated into the second angular position.

11. An electrical connector including the combination of a first section, a first shell in said first section, a first set of electrical contacts in said shell, a second section, a second shell in said second section and movable between an extended position and a retracted position, a second set of electrical contacts in said second shell and adapted to mate with said first set of contacts when said shell is in the extended position, a sleeve being rotatably mounted on the second shell, a first annular array of shoulders on said sleeve, a second annular array of shoulders on said first section, the shoulders in said second array being circumferentially spaced and positioned to engage the shoulder in said first array and secure said sections together, said *second array of* shoulders being separated by a plurality of openings and positioned to allow said *first array of* shoulders to pass therethrough when the sleeve is rotated into a first angular position and to engage the *first array of* shoulders when it is rotated into a second angular position, *the rotation of said sleeve being at zero pitch,* means for moving said second shell into said retracted position when said sleeve is rotated into said first angular position and into the extended position when said sleeve is rotated into the second angular position, an electrical insulating insert in the first shell member, said first set of electrical contacts being disposed in said insert, an electrical insulating insert in the second shell member, said second set of electrical contacts being disposed in said second insert, one of said inserts being movable with said second shell between said retracted position wherein the contacts in the first and second sets are separated and an extended position wherein they are mated, and means on said sleeve for moving the movable insert between the retracted and extended positions when said sleeve is rotated between said angular positions.

12. The connector of claim 11 wherein said last means includes a high pitch thread for moving said insert between said positions with less than one turn, and a spring biasing the insert toward the extended position.

13. An electrical connector including the combination of a first shell member having a passage therein, a first set of electrical contacts in said shell member, a second shell member having a portion adapted to mate with said first shell member, a second set of electrical contacts in said shell member, a plurality of keys on said portion, a plurality of key-ways in said passage aligned with said keys and adapted to pass therethrough when said shell members are mated, a sleeve rotatably mounted on said first shell members for rotation between a first angular position and a second angular position, an annular shoulder on said sleeve adapted to engage the keys when said sleeve is [in a] *rotated at zero pitch from the first angular position into the* second angular position, and a set of high pitch threads on said sleeve and effective to move said second set of contacts into a mating position when said sleeve is rotated into one of said angular positions.

14. An electrical connector including the combination of a first shell member, a first set of electrical contacts in said shell member, a passage extending axially into said first shell member, a plurality of key-ways circumferentially spaced around the passage, a second shell member, a second set of electrical contacts in said second shell member, a barrel on the second shell member adapted to fit into said passage when said shell members are mated, a plurality of keys circumferentialy spaced around said barrel and adapted to mate with and fit into said key-ways when said shell members are mated, said keys forming a plurality of shoulders circumferentially spaced around said barrel, *at zero pitch* a sleeve rotatably mounted on said first shell member for rotation between a first angular position and a second angular position, a plurality of keeper means on said sleeve, *circumferentially spaced around said sleeve at zero pitch* said keeper means being positioned to pass between said keys when the sleeve is in the first angular position and to engage the shoulders formed by the keys when the sleeve is in the second angular position, a high pitch set of threads on said sleeve, and a spring exerting an axial force on said sleeve.

[15. An electrical connector including the combination of a first section, an electrical insulating insert in said section, a first set of electrical contacts in said insert, a second section adapted to mate with said first section, an electrical insulating insert in said second section, a second set of electrical contacts in said second insert, the electrical contacts in said sets being adapted to mate with each other, one of said inserts being movable relative to its section between a fully retracted position wherein said electrical contacts are completely separated and electrically unmated and a fully extended position, wherein said electrical contacts are completely engaged and electrically mated, and high pitch thread means operatively interconnecting one of said inserts to its section for moving said one of said inserts relative to its section said pitch being sufficiently high to cause, when said sections are mated, one of said inserts to move from the fully retracted position to the fully extended position as a result of only a partial revolution.]

[16. The connector of claim 15 including a breech lock.]

17. An electrical connector including the combination of a first section, a second section, a *zero pitch* breech lock on said sections movable between a lock position and an unlock position releasably securing said sections together, a first set of electrical contacts in one of said sections, a second set of electrical contacts in the other of said sections, one of said contact sets being movable between a mating position wherein the contacts therein engage and mate with the contacts in the other set of contacts and an unmated position wherein the contacts therein separate from and do not mate with the contacts in the other set, and a set of mating screw threads operatively interconnected with said breech lock for moving said movable set of contacts between the mated position and the unmated position as said breech lock moves between locked position and the unlocked position.

18. An electrical connector including the combination of a first section, a second section, a *zero pitch* breech lock on said sections for releasably securing said sections together when one of said sections is rotated in a first direction and for releasing said sections when it is rotated in a second direction, a first set of electrical contacts in one of said sections, a second set of electrical contacts in the other of said sections, one of said contact sets being movable between a mating position wherein it engages the other set of contacts and an unmated position wherein it does not engage the other set, a set of mating screw threads for moving said movable set of contacts into said mating position when said first section it rotated in said first direction and into said unmating position when said first section is rotated in said second direction, and said threads having a high pitch whereby said set of contacts moves between said mated and unmated positions when said first section is rotated less than one revolution.

19. The connector of claim 18 including a spring producing an axial force which coacts with said set of threads for biasing said contacts toward the mated position.

20. An electrical connector including the combination of a first section, a second section adapted to mate with said first section, a first set of electrical contacts in said first section, a second set of electrical contacts in said second section, said second set of contacts being movable in said second section between a mating position wherein said contacts mate with the contacts in the first set when said sections are mated and an unmating position wherein said contacts are separated from the contacts in the first set, an annular array of shoulders on one of said sections *arranged at zero pitch*, an annular array of projections on the other of said sections *arranged at zero pitch*, said projections being circumferentially spaced and positioned to allow said projections to pass between said shoulders when one of said sections is rotated in a first direction into a first angular position and to engage the shoulders when rotated in a second direction into a second angular position, a set of mating threads on one of said sections for moving said second set of electrical contacts between said mating and unmating positions when said projections are moved between said first and second angular positions, and a spring resiliently biasing said threads toward said mating position.

21. An electrical connector including the combination of a first section, a first shell member in said first section, a first set of electrical contacts in said first shell member, a second section adapted to mate with said first section, a second shell member in said second section adapted to mate with said first shell member when said sections are mated with each other, a second set of electrical contacts in said second shell member, a sleeve in one of said sections, said sleeve being rotatably mounted relative to the shell member in said section, a set of mating threads on said shell and said sleeve effective to move said shell between an extended position wherein said shell members and the electrical contacts in said sets mate when said sleeve is rotated in one direction and a retracted position wherein said shell members and the electrical contacts in said sets are separated when said sleeve is rotated in the opposite direction, an annular array of shoulders on one of said sections *arranged at zero pitch*, an annular array of projections on the other sections *arranged at zero pitch*, said shoulders and said projections being circumferentially spaced around and positioned to engage each other and secure said sections together when said sleeve is rotated in said first direction, and said projections and annular shoulders being positioned to allow said projections to pass between said shoulders when the sleeve is rotated in the second direction.

*22. An electrical connector including the combination of*

*a plug section,*

*a first set of electrical contacts in said section,*

*a receptacle section, said receptacle section being effective to mate with said plug section,*

*a second set of electrical contacts in said receptacle section,*

*a zero pitch locking means on said sections effective to releasably secure said sections together when they are mated, including on one of said sections circumferentially arranged detent means and cooperating shoulder means axially spaced from said detent means, and further including on the other of said sections a circumferentially movable member having flange means*

*adapted to fit between said detent means and said shoulder means, and*

*means on the other of said sections operatively interconnected with said movable member for driving the set of contacts thereof linearly into and out of engagement with the other set of contacts in response to circumferential movement of said movable member to secure said sections together and release them from each other, said detent means and shoulder means providing bearings for the two direction of driving action.*

*23. An electrical connector including the combination of*

*a plug section,*

*a first set of electrical contacts in said plug section,*

*a receptacle section,*

*a second set of electrical contacts in said receptacle section, said receptacle section being adapted to mate with the plug section whereby the electrical contacts in said first set mate with the electrical contacts in said second set,*

*zero pitch locking means on said sections adapted to releaseably secure said sections together when they are mated with each other, including on one of said sections circumferentially arranged detent means and cooperating shoulder means axially spaced from said detent means, and further including on the other of said sections a circumferentially movable member having flange means adapted to fit between said detent means and said shoulder means, and*

*a set of mating screw threads on said circumferentially movable member and said other of said sections for driving the set of electrical contacts in said other of said sections linearly into and out of mating engagement with the other set of contacts in response to circumferential movement of said movable member, said detent means and shoulder means providing bearings for the two directions of driving action.*

*24. An electrical connector including the combination of*

*a plug section,*

*a first set of electrical contacts in said plug section,*

*a receptacle section,*

*a second set of electrical contacts in said receptacle section, said receptacle section being adapted to mate with the plug section whereby the electrical contacts in said first set mate with the electrical contacts in said second set,*

*a zero pitch locking means in said sections effective to releasably secure said sections together when they are mated, including on one of said sections circumferentially arranged detent means and cooperating shoulder means axially spaced from said detent means, and further including on the other of said sections a circumferentially movable member having flange means adapted to fit between said detent means and said shoulder means,*

*said movable member being circumferentially movable in a first direction into a first angular position and in a second direction into a second angular position,*

*said movable member when in the first angular position being effective to securely lock said sections together in the mated position by engagement of said flange means with said detent means, and when in the second angular position said flange means and detent means being out of engagement allowing said sections to freely mate and unmate, and*

*a mating set of screw threads on said on said movable member and said other of said sections for driving the set of electrical contacts thereon linearly into electrical mating engagement with the other set of electrical contacts when said movable member is circumferentially moved in said first direction and driving it out of electrical mating engagement when circumferentially moved in said second direction, said detent means providing a bearing for the first-mentioned driving action and said shoulder means providing a bearing for the second-mentioned driving action.*

*25. An electrical connector as set forth in claim 24, and further including a resilient spring means effective to react with said threads to bias said movable member toward said first angular position.*

*26. An electrical connector including the combination of*

*a plug section,*

*a first set of electrical contacts on said plug section,*

*a receptacle section adapted to mate with said plug section,*

*a second set of electrical contacts on said receptacle section,*

*one of said sets being movable between a first position wherein said contacts are electrically mated and a second position wherein they are electrically unmated,*

*a zero pitch locking means on said sections including a plurality of circumferentially arranged detent means and a cooperating shoulder means axially spaced therefrom on one of said sections and a movable member having flange means adapted to fit between said detent means and said shoulder means on the other of said sections,*

*said movable member being rotatable between a first angular position wherein its flange means engages the detent means and a second angular position wherein its flange means does not engage said detent means,*

*resilient spring means effective to bias said movable member toward said first angular position, and*

*means operatively coupling said movable member and said movable set of contacts for driving said set linearly into the first mated position when said movable member is rotated into said first angular position and driving it into the second unmated position when said movable member is rotated into said second angular position, said detent means providing a bearing for the first-mentioned driving action, and said shoulder means providing a bearing for the second-mentioned driving action.*

*27. An electrical connector including the combination of*

*a first member,*

*a first set of electrical contacts in said member,*

*a second member, said members being adapted to mate with each other,*

*a second set of electrical contacts in said second member,*

*a plurality of axially oriented complimentary keys and key-ways on said members for guiding said members into mated position,*

*a zero pitch locking means having detent means and shoulder means axially spaced therefrom on one of said members and a keeper on the other of said members having flange means adapted to fit between said detent means and said shoulder means,*

*said keeper being rotatably movable between a first position wherein said flange means engages the detent means and a second position wherein said flange means does not engage the detent means, and*

*means on one of said members cooperating with said keeper for driving the set of contacts on one of said members linearly into engagement with the set of contacts on the other of said members when said keeper is rotated into said first position and for driving*

*it out of engagement when said keeper is rotated into said second position, said detent means providing a bearing for the first-mentioned driving action, and said shoulder means providing a bearing for the second-mentioned driving action.*

*28. An electrical connector including the combination of*

*a first section,*

*a first shell in said first section,*

*a first set of electrical contacts in said shell,*

*a second section,*

*a second shell in said second section, said second shell being movable between an extended position and a retracted position,*

*a second set of electrical contacts in said second shell, the electrical contacts in said second set mating with the electrical contacts in said first set of contacts when said shell is in the extended position, the electrical contacts in said second set being separated and electrically isolated from the contacts in the first set when said shell is in the retracted position,*

*a sleeve rotatably mounted on the second shell,*

*a first annular array of shoulders on said sleeve arranged at zero pitch,*

*a second annular array of shoulders on said first section arranged at zero pitch, the shoulders in said second array being circumferentially spaced and positioned to engage the shoulders in said first array and secure said sections together,*

*both said arrays of shoulders being separated by a plurality of openings positioned to allow said arrays to pass through one another when the sleeve is rotated into a first angular position and to engage each other when it is rotated into a second angular position,*

*an additional shoulder extending annularly about said first section and axially spaced from said second annular array of shoulders, said first annular array of shoulders being adapted to fit between said additional shoulder and said second annular array of shoulders, and*

*means on said sleeve cooperating with said second shell for driving said second shell linearly into said retracted position when said sleeve is rotated into said first angular position and driving it linearly into the extended position when said sleeve is rotated into the second angular position, said second annular array of shoulders providing a bearing for the second-mentioned driving action, and said additional shoulder providing a bearing for the first-mentioned driving action.*

*29. An electrical connector including the combination of*

*a first section,*

*a first shell in said first section,*

*a first set of electrical contacts in said shell,*

*a second section,*

*a second shell in said second section and movable between an extended position and a retracted position,*

*a second set of electrical contacts in said second shell and adapted to mate with said first set of contacts when said shell is in the extended position and to be separated therefrom when said shell is in the retracted position,*

*a sleeve rotatably mounted on the second shell,*

*a first annular array of shoulders on said sleeve arranged at zero pitch,*

*a second annular array of shoulders on said first section arranged at zero pitch, the shoulders in said second array being circumferentially spaced and positioned to engage the shoulders in said first array and secure said sections together,*

*both said arrays of shoulders being separated by a plurality of openings positioned to allow said arrays to pass through one another when the sleeve is rotated into a first angular position and to engage each other when it is rotated into a second angular position,*

*an additional shoulder extending annularly about said first section and axially spaced from said second annular array of shoulders, said first annular array of shoulders being adapted to fit between said additional shoulder and said second annular array of shoulders,*

*means on said sleeve cooperating with said second shell for driving said second shell linearly into said retracted position when said sleeve is rotated into said first angular position and driving it linearly into the extended position when said sleeve is rotated into the second angular position, said second annular array of shoulders providing a bearing for the second-mentioned driving action, and said additional shoulder providing a bearing for the first-mentioned driving action,*

*an electrical insulating insert in the first shell member,*

*said first set of electrical contacts being disposed in said insert, and*

*an electrical insulating insert in the second shell member,*

*said second set of electrical contacts being disposed in said second insert,*

*said second insert being movable with said second shell between said retracted position wherein the contacts in the first and second sets are separated and an extended position wherein they are mated.*

*30. An electrical connector including the combination of*

*a first section,*

*a second section,*

*a zero pitch locking means on said sections movable between a lock position and an unlock position releasably securing said sections together, including on one of said sections circumferentially arranged detent means and cooperating shoulder means axially spaced from said detent means, and further including on the other of said sections a circumferentially movable member having flange means adapted to fit between said detent means and said shoulder means,*

*a first set of electrical contacts in one of said sections,*

*a second set of electrical contacts in the other of said sections, one of said contacts sets being movable between a mating position wherein the contacts therein engage and mate with the contacts in the other set of contacts and an unmated position wherein the contacts therein separate from and do not mate with the contacts in the other set, and*

*a set of mating screw threads operatively interconnecting said member and said movable set of contacts for driving it linlearly from the unmated to the mated position and from the mated to the unmated position as said locking means is moved between locked position and unlocked position, said detent means and shoulder means providing bearings for the two directions of driving action.*

*31. An electrical connector including the combination of*

*a first section,*

*a second section,*

*a zero pitch locking means on said sections for releasably securing said sections together when one of said sections is rotated in a first direction and for releasing said sections when it is rotated in a second direction,*

*including on one of said sections circumferentially arranged detent means and cooperating shoulder means axially spaced from said detent means, and further including on the other of said sections a circumferentially movable member having flange means adapted to fit between said detent means and said shoulder means,*

*a first set of electrical contacts in one of said sections,*

*a second set of electrical contacts in the other of said sections, one of said contact sets being movable between a mating position wherein it engages the other set of contacts and a unmated position wherein it does not engage the other set,*

*a set of mating screw threads for driving said movable set of contacts linearly into said mating position when said one section is rotated in said first direction and into said unmating position when said one section is rotated in said second direction, said detent means and shoulder means providing bearings for the two directions of driving actions, and*

*said threads having a high pitch whereby said one set of contacts moves between said mated and unmated positions when said one section is rotated less than one revolution.*

*32. An electrical connector including the combination of*

*a first section,*

*a second section adapted to mate with said first section,*

*a first set of electrical contacts in said first section,*

*a second set of electrical contacts in said second section, said second set of contacts being movable in said second section between a mating position wherein said contacts mate with the contacts in the first set when said sections are mated and an unmating position wherein said contacts are separated from the contacts in the first set,*

*an annular array of shoulders and a cooperating additional annularly arranged shoulder axially spaced from said annular array of shoulders on said first section all arranged at zero pitch,*

*an annular array of projections on said second section arranged at zero pitch adapted to fit between said annular array of shoulders and said additional shoulder, said projections being circumferentially spaced and positioned to allow said projections to pass between said shoulders when one of said sections is rotated in a first direction into a first angular position and to engage the shoulders when rotated in a second direction into a second angular position,*

*a set of mating threads on said second section for driving said second set of electrical contacts linearly from said mating to said unmating positions when said sections are rotated from said second to said first angular position, and vice versa when said sections are rotated from said first to said second angular position, and said annular array of shoulders and said additional annularly arranged shoulder providing bearings for the two directions of driving actions, and*

*a spring resiliently biasing said threads toward said mating position.*

*33. An electrical connector including the combination of*

*a first section,*

*a first shell member in said first section,*

*a first set of electrical contacts in said first shell member,*

*a second section adapted to mate with said first section,*

*a second shell member in said second section adapted to mate with said first shell member when said sections are mated with each other,*

*a second set of electrical contacts in said second shell member,*

*a sleeve rotatably mounted on said first section,*

*a set of mating threads on said first shell member and said sleeve effective to drive said shell member linearly from an extended position wherein said shell members and the electrical contacts in said sets mate to a retracted position wherein said shell members and the electrical contacts in said sets are separated when said sleeve is rotated in one direction, and vice versa when said sleeve is rotated in the opposite direction,*

*an annular array of shoulders and a cooperating additional annularly arranged shoulder axially spaced from said annular array of shoulders on said second section all arranged at zero pitch,*

*an annular array of projections on said sleeve arranged at zero pitch adapted to fit between said annular array of shoulders and said additional shoulder,*

*said annular array of shoulders and said projections being circumferentially spaced around their respective sections and positioned to engage each other and secure said sections together when said sleeve is rotated in said one direction, and*

*said projections and annular shoulders being positioned to allow said projections to pass between said shoulders when the sleeve is rotated in said opposite direction,*

*said annular array of shoulders and said additional annularly arranged shoulder providing bearings for the two directors of driving actions.*

* * * * *

* * * * *